S. M. Davis,
Tent.
No. 32,861.   Patented July 23, 1861.
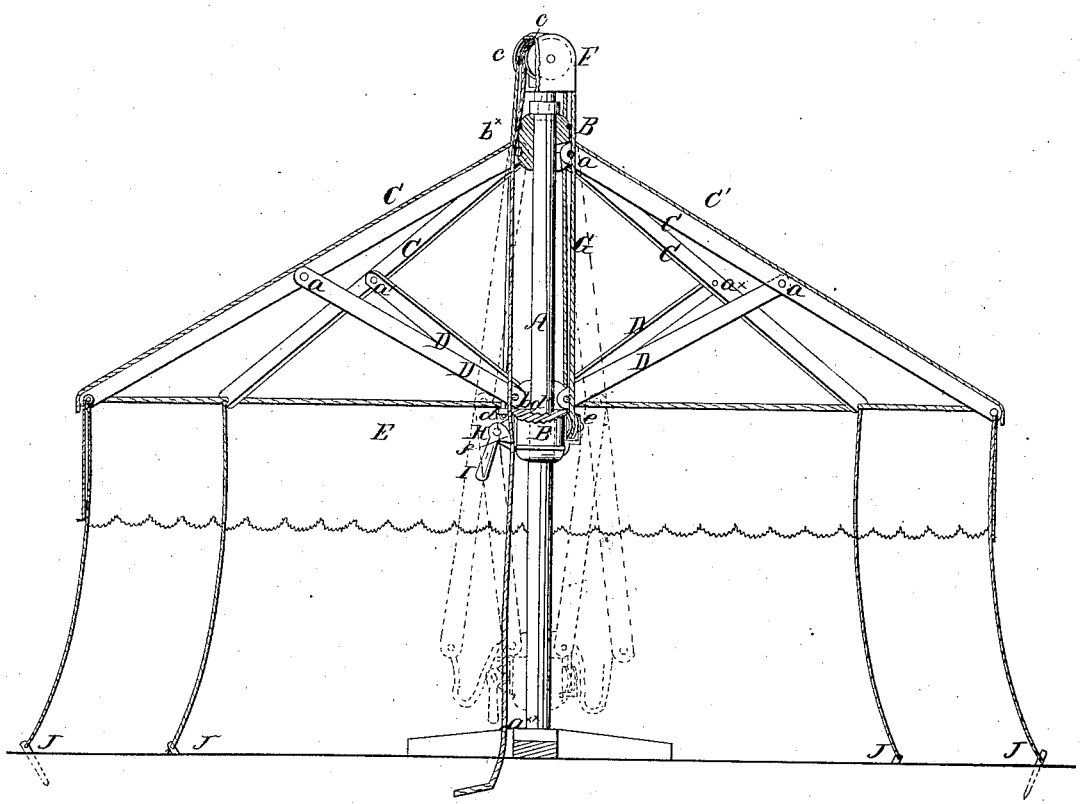

UNITED STATES PATENT OFFICE.

S. M. DAVIS, OF LAWRENCE, MASSACHUSETTS, ASSIGNOR TO ANDREW L. HASKELL, OF CHELSEA, MASSACHUSETTS.

TENT.

Specification of Letters Patent No. 32,861, dated July 23, 1861.

*To all whom it may concern:*

Be it known that I, S. M. DAVIS, of Lawrence, in the county of Essex and State of Massachusetts, have invented a new and Improved Tent Designed for Military and other Purposes; and I do hereby declare that the following is a full, clear, and exact description of the same, reference being had to the annexed drawing, making a part of this specification, said drawing being a vertical central section of my invention.

The object of this invention is to provide a tent which may be erected with great facility, raised or lowered on its pole, so as to form a more or less open or a close tent, as may be desired, and one that may rotate on its pole.

To enable those skilled in the art to fully understand and construct my invention I will proceed to describe it.

A represents a pole which is firmly secured in or to the ground in a vertical position and in any proper way; and B B' represent two hubs which are fitted loosely on the pole A and allowed to slide freely up and down and also rotate thereon. To the hub B there are attached a series of radial arms C, said arms being attached to the hub B by a wire $a$, which passes through the arms and is fitted in a groove made circumferentially in the hub, the hub being mortised to receive the ends of the arms. To the lower hub B' braces D are attached by a wire $b$, in precisely the same way as the arms C are attached to the upper hub B, the outer ends of the braces being connected to the arms C by joints $a^{*}$. By this arrangement it will be seen that the arms C may be expanded or folded by sliding either hub B or B' on the pole A.

On the arms C a suitable canvas or covering C' is fitted and a pendent canvas E may be secured to the ends of the arms. On the upper end of the pole A there is fitted a swivel block or sheave F which contains two pulleys $c, c$, around which a rope G passes. One end of this rope is attached to the lower hub B' as shown at $d$, a knot being made in said rope and catching against a guide or staple $d^{*}$, and said rope passes around a pulley $e$, on the side of the hub B' opposite to $d$, and then extends from the block F downward and is secured to hub B' by a clamp H which may be composed simply of a lever I with an eccentric $f$, at its inner end. By drawing downward the loose end of rope G the hubs B B' will be elevated on the pole A and the frame thereby elevated at any desired height thereon and secured by the clamp H.

In pleasant summer weather the frame may be fully elevated on its pole A and the frame may turn thereon with the wind and serve as a sort of fan or ventilator to keep the interior cool and pleasant. In disagreeable or cold weather the frame may be lowered on the pole until the pendent canvas E touches the ground, and stakes J may be employed to secure the frame to the earth.

The tent may be readily taken down and folded by first lowering the frame on the pole to its fullest extent or until a knot $a^{**}$, on the rope comes in contact with a guide $b^{*}$, on hub B, and then drawing down the end of rope G at the point of connection $d$, by which the upper hub B will be elevated on its pole and the arms C folded, as shown in red, the pole A may then be taken down and stowed away in a very compact form.

The clamp H, it will be seen, admits of the rope G being drawn downward and the frame elevated without being actuated, but in order to lower the frame, the lever I must be elevated in order to allow the eccentric $f$ to clear the rope and permit the latter to move upward past it.

Having thus described my invention what I claim as new and desire to secure by Letters Patent, is—

A folding adjustable tent made and operating as herein shown and described.

S. M. DAVIS.

Witnesses:
 JOSEPH NORRIS,
 HEZEKIAH PLUMMER.